United States Patent
Son et al.

(10) Patent No.: US 12,440,998 B2
(45) Date of Patent: Oct. 14, 2025

(54) DOCKING DEVICE, DOCKING SYSTEM AND METHOD INCLUDING THE SAME

(71) Applicant: HYUNDAI MOBIS CO., LTD., Seoul (KR)

(72) Inventors: Sae Jin Son, Suwon-si (KR); Min Cheol Jeong, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 251 days.

(21) Appl. No.: 18/347,027

(22) Filed: Jul. 5, 2023

(65) Prior Publication Data
US 2024/0009855 A1  Jan. 11, 2024

(30) Foreign Application Priority Data
Jul. 5, 2022  (KR) .................. 10-2022-0082640

(51) Int. Cl.
G05D 1/02 (2020.01)
B25J 11/00 (2006.01)
G05D 1/00 (2006.01)

(52) U.S. Cl.
CPC .......... B25J 11/008 (2013.01); G05D 1/0225 (2013.01)

(58) Field of Classification Search
CPC ........ B25J 11/008; B25J 11/00; B25J 9/0096; B25J 5/007; G05D 1/661; G05D 1/0225; G05D 1/244; G05D 2109/10
See application file for complete search history.

(56) References Cited

U.S. PATENT DOCUMENTS

| | | | | |
|---|---|---|---|---|
| 11,925,306 B2* | 3/2024 | Brouwers | ............ | A47L 9/2894 |
| 11,940,799 B2* | 3/2024 | Poluboiarinov | ..... | G06V 40/161 |
| 11,974,519 B2* | 5/2024 | Holgersson | ............ | G05D 1/648 |
| 12,096,909 B2* | 9/2024 | Wong | ..................... | A47L 9/2805 |
| 12,102,283 B2* | 10/2024 | Jo | ........................... | G10L 15/28 |
| 12,234,111 B2* | 2/2025 | Hoofard | ................ | G05D 1/661 |
| 12,251,059 B2* | 3/2025 | Neumann | ........... | A47L 11/4063 |
| 12,251,075 B2* | 3/2025 | Kim | .................... | A47L 11/4091 |

OTHER PUBLICATIONS

Su et al., Motion Planning of Multi-docking System for Intelligent Mobile Robots, 2014, IEEE, p. 1279-1282 (Year: 2014).*
Roh et al., Flexible docking mechanism using combination of magnetic force with error-compensation capability, 2008, IEEE, p. 697-702 (Year: 2008).*
Shen et al., Docking in self-reconfigurable robots, 2001, IEEE, p. 1049-1054 (Year: 2001).*
Vaz et al., Docking of a mobile platform based on infrared sensors, 1997, IEEE, p. 735-740 (Year: 1997).*

* cited by examiner

Primary Examiner — McDieunel Marc
(74) Attorney, Agent, or Firm — NSIP Law

(57) ABSTRACT

A docking device to move a mobile robot to a docking area includes a docking guide configured to detect an entry position of the mobile robot and to guide the mobile robot to the docking area and including a connecting part configured to be coupled to and separated from a part of the mobile robot, and a guide rail disposed to provide a path for the docking guide to move to the docking area, in response to the part of the mobile robot being coupled to the docking guide.

19 Claims, 10 Drawing Sheets

DOCKING DEVICE, DOCKING SYSTEM AND METHOD INCLUDING THE SAME

CROSS-REFERENCE TO RELATED APPLICATIONS

This application claims the benefit under 35 U.S.C. § 119(a) of Korean Patent Application Number 10-2022-0082640, filed on Jul. 5, 2022, in the Korean Intellectual Property Office, the entire disclosure of which is incorporated herein by reference for all purposes.

BACKGROUND

1. Field

The present disclosure relates to a docking device, a docking system including the same, and a docking method.

2. Discussion of Related Art

The statements in this section merely provide background information related to the present disclosure and may not constitute prior art.

In a logistics field where an autonomous mobile robot (AMR) is employed for logistics automation, the autonomous mobile robot is configured to load and transport goods at a designated place. A docking device that assists the autonomous mobile robot to accurately arrive at a designated place is disposed at the logistics field.

FIG. 1 is a perspective view of a docking device according to a comparative example.

An autonomous mobile robot 20 detects a reflection plate 11 and moves toward the reflection plate 11. A docking device 10 detects the entry of the autonomous mobile robot 20 using a sensor 14 and operates a driver 13 to move the reflection plate 11 inward using a belt 12. Then, the autonomous mobile robot 20 enters while maintaining a certain distance from the reflection plate 11 without colliding with the reflection plate 11.

As the autonomous mobile robot 20 enters while maintaining a certain distance from the reflection plate 11, the docking device 10 determines the position of the autonomous mobile robot 20 using a plurality of sensors 14. When it is determined that the autonomous mobile robot 20 has arrived at a predetermined position, the docking device 10 stops the operation of the driver 13 to stop the reflection plate 11.

In the case of the docking device 10 according to the comparative example, it is necessary to provide a controller (not shown), the belt 12, the driver 13, and the plurality of sensors 14 to control the operation of the reflection plate 11. Moreover, it is necessary to continuously supply electricity supplied to control the operation of the reflection plate 11.

The above-mentioned background art is possessed or acquired by the inventor in the process of deriving the present disclosure and cannot necessarily be said to be a known technology disclosed to the general public prior to the filing of the present disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a docking device to move a mobile robot to a docking area, the docking device including a docking guide configured to detect an entry position of the mobile robot and to guide the mobile robot to the docking area and including a connecting part configured to be coupled to and separated from a part of the mobile robot, and a guide rail disposed to provide a path for the docking guide to move to the docking area, in response to the part of the mobile robot being coupled to the docking guide.

The connecting part may include an engaging part configured to be coupled to the part of the mobile robot, a guide pin configured to separate the mobile robot and the engaging part, and a body part supporting the engaging part and the guide pin.

The docking guide may include a reflection plate configured to reflect a signal from an object detector for the mobile robot to detect a docking entry position using the object detector.

The engaging part may be formed to protrude along a direction of the mobile robot exiting from the docking area.

The connecting part may be rotatably coupled to the reflection plate.

The guide pin may be coupled to the body part to be rotatable along a direction of the mobile robot exiting from the docking area.

The docking device may include a separation leading unit disposed on a movement path of the mobile robot, wherein the separation leading unit may be configured to separate the mobile robot and the engaging part by engaging the guide pin during the movement of the mobile robot.

The separation leading unit may include a fixed part fixed to a rail plate supporting the guide rail, and a protruding part protruding from the fixed part and being configured to engage the guide pin.

The docking guide may include an elastic member connecting the body part and the reflection plate.

The docking guide may be configured to be coupled to the mobile robot and move together, in response to the mobile robot exiting from the docking area.

The docking guide may include a supporting part configured to allow one side thereof to contact the mobile robot, in response to the mobile robot enters the docking area.

The docking guide may include a buffer disposed on one side of the supporting part to prevent damage to the mobile robot which is brought into contact with the supporting part.

The docking device may include a sensed body disposed in the docking area and being configured to determine whether the mobile robot has arrived at the docking area.

The guide pin may be configured to rotate in one direction with respect to the body part within an angle, and to not rotate in a direction opposite to the one direction with respect to the body part, the guide pin may be rotated in the one direction within the angle to avoid a protruding structure disposed on the guide rail and to maintain the engaged state of the engaging part and the mobile robot, in response to the mobile robot moving toward the docking area, and the guide pin may be engaged with the protruding structure and rotated along with the body part and the engaging part in the opposite direction to release the engaging part from the mobile robot, in response to the mobile robot moving away from the docking area.

The mobile robot and the docking guide may be separated as at least a part of the connecting part rotates.

The mobile robot may be an autonomous mobile robot.

In another general aspect, there is provided a docking system including an mobile robot, and a docking device configured to guide the mobile robot to a docking area, wherein the docking device includes a docking guide configured to detect an entry position of the mobile robot and to guide the mobile robot to the docking area and including a connecting part configured to be coupled to and separated from a part of the mobile robot, and a guide rail disposed to provide a path for the docking guide to move to the docking area, in response to the part of the mobile robot being coupled to the docking guide.

The mobile robot may enter the docking area while pushing the docking guide.

The mobile robot may include a bracket configured to be coupled to and separated from the connecting part.

At least a part of the connecting part may have a ring shape.

Other features and aspects will be apparent from the following detailed description, the drawings, and the claims.

Figure 1:
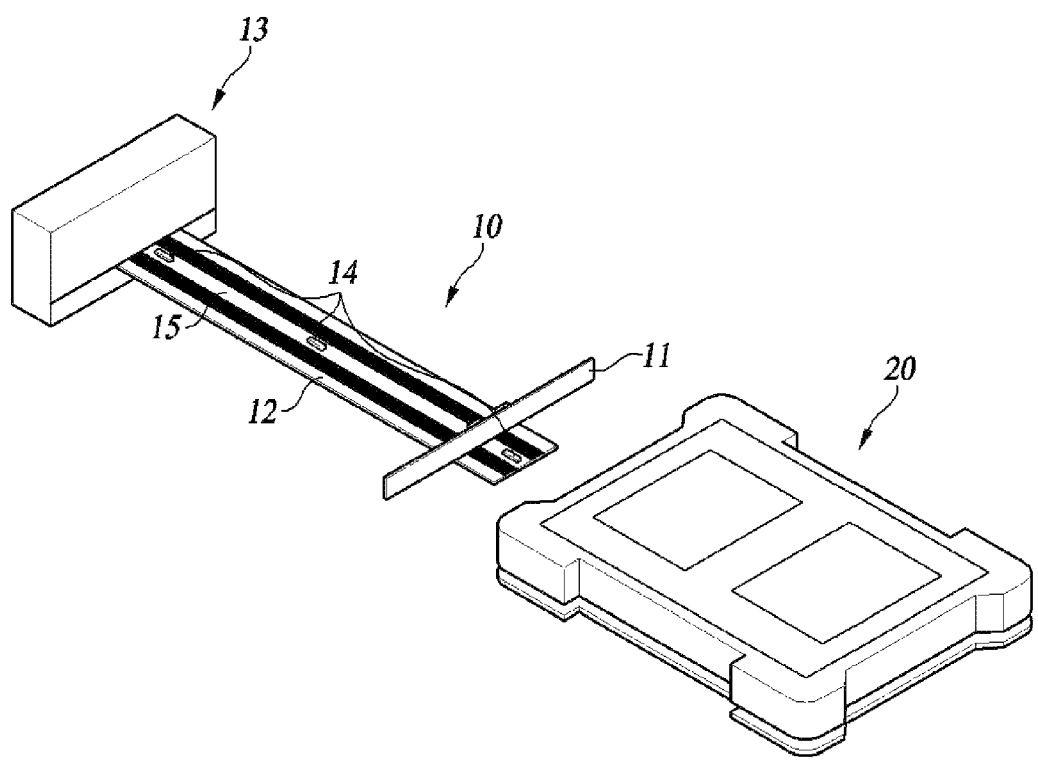
FIG. 1 is a perspective view of a docking device according to a comparative example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", orA, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. As used herein, the term "and/or" includes any and all combinations of one or more of the associated listed items. For example, "A and/or B" may be interpreted as "A," "B," or "A and B."

The terminology used herein is for the purpose of describing particular examples only and is not to be limiting of the examples. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

A docking device according to an embodiment can provide the convenience of maintenance by minimizing the components of the device.

The docking device according to an embodiment can dock with an autonomous mobile robot without any power supply.

The docking device according to an embodiment can reduce the manufacturing cost.

The problems to be solved by the present disclosure are not limited to those mentioned above, and other problems not mentioned will be clearly understood by those skilled in the art from the description below.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components.

When it is mentioned that any component is "connected" or "coupled" to another component, it is to be understood that any component may be directly connected or coupled to another component or is connected or coupled to another component with the other component interposed therebetween.

Throughout the present specification, unless explicitly described to the contrary, "including" or "comprising" any components will be understood to imply the inclusion of other elements rather than the exclusion of any other elements.

A term "~unit," "module," or the like, described in the specification means a unit of processing at least one function or operation and may be implemented by hardware or software or a combination of hardware and software.

Unless otherwise stated, it should be noted that a description of any one embodiment may be applied to other embodiments as well.

The description of the present disclosure to be disclosed below with the accompanying drawings is intended to describe exemplary embodiments of the present disclosure, and is not intended to represent the only embodiments in which the present disclosure may be practiced.

Figure 2:
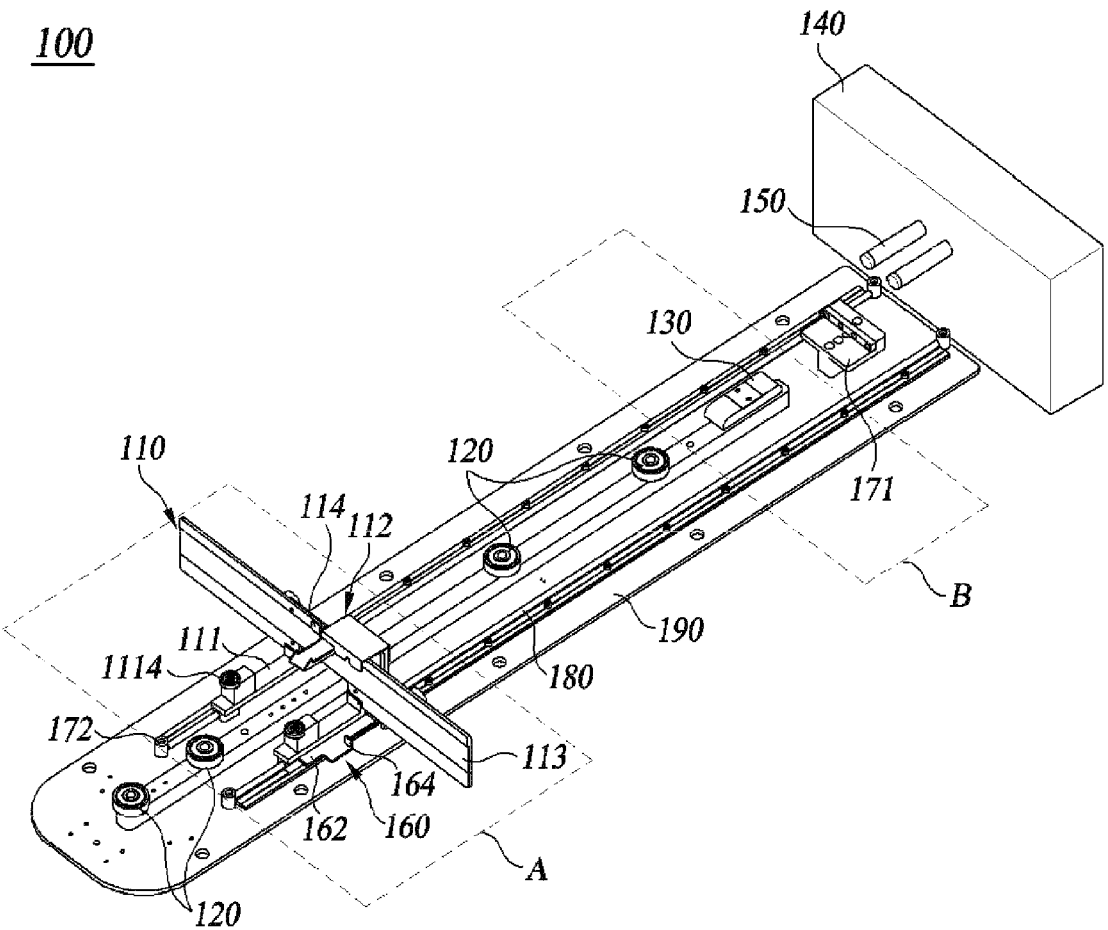
FIG. 2 is a perspective view of a docking device according to an embodiment of the present disclosure.

FIG. 2 is a perspective view of a docking device according to an embodiment of the present disclosure.

Figure 3:
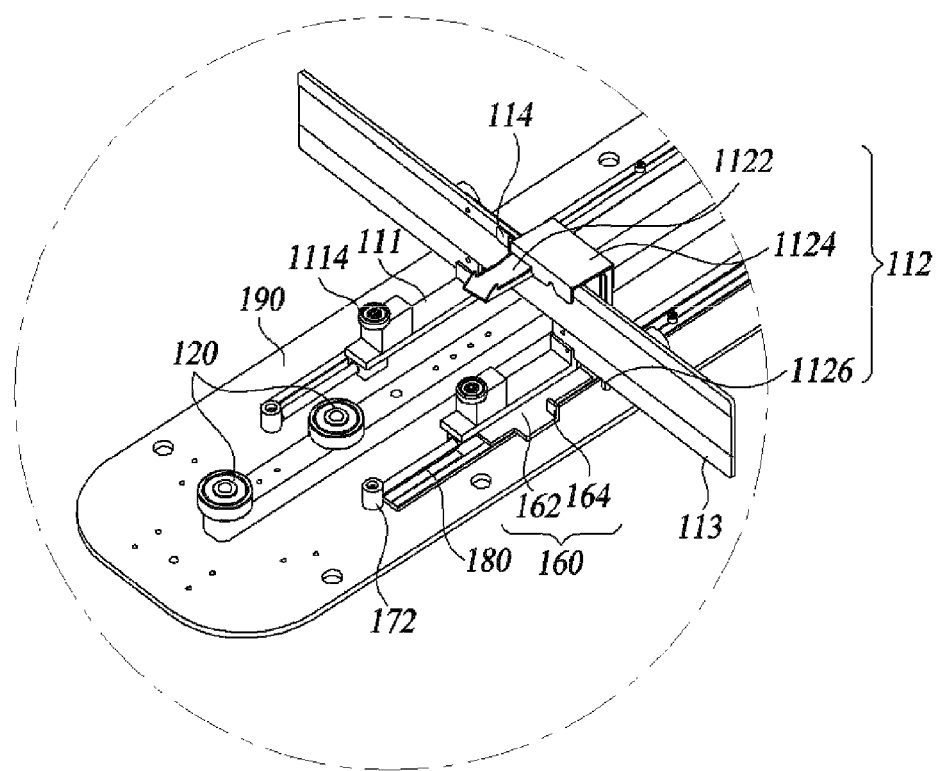
FIG. 3 is an enlarged view of a docking guide according to an embodiment of the present disclosure.

FIG. 3 is an enlarged view of a docking guide according to an embodiment of the present disclosure.

Figure 4:
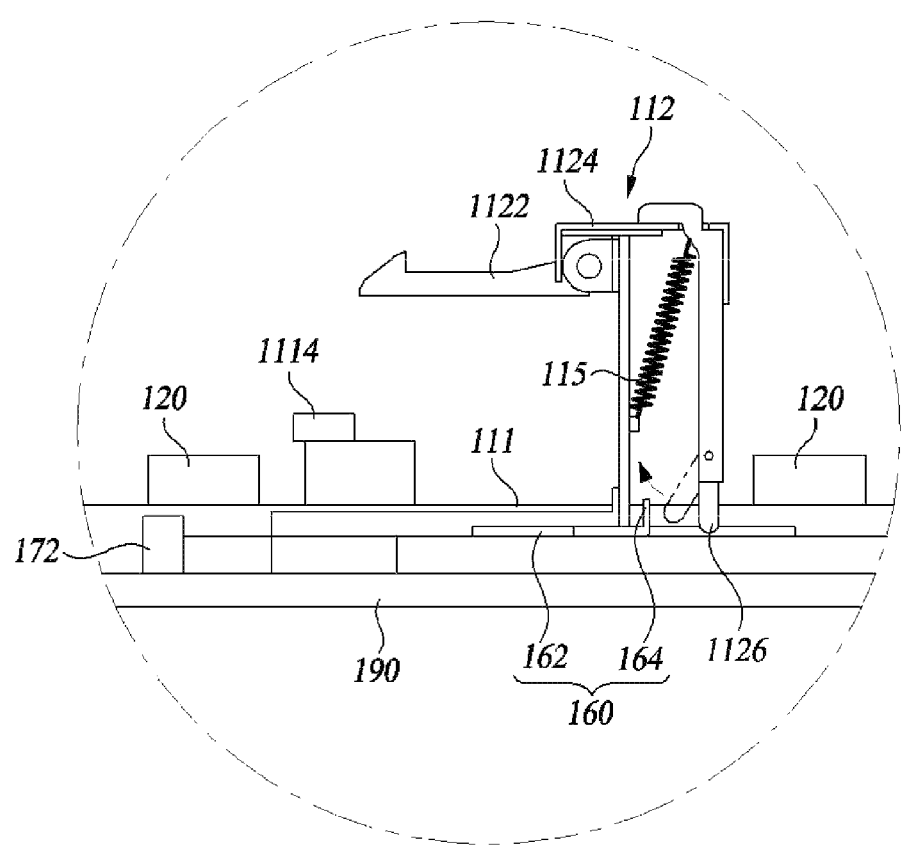
FIG. 4 is a side view of a docking guide according to an embodiment of the present disclosure.

FIG. 4 is a side view of a docking guide according to an embodiment of the present disclosure.

Referring to FIGS. 2 to 4, a docking device 100 according to the present disclosure may include all or part of a docking guide 110, a guide roller 120, a sensed body 130, a separation leading unit 160, a first stopper 171, a second stopper 172, a guide rail 180, and a rail plate 190.

The guide rail 180 is disposed to provide a path for the docking guide 110 to move to a docking area B. When a mobile robot 200, which may also be referred to as an autonomous mobile robot 200, (see FIG. 5 below) recognizes the docking guide 110 and enters the docking area B, the guide rail 180 may be disposed to allow the docking guide 110 to move linearly toward the docking area B.

In a section in which the autonomous mobile robot 200 moves along the guide rail 180, a plurality of guide rollers 120 may be spaced apart from each other at predetermined intervals. The guide rollers 120 may be disposed to guide the movement of the autonomous mobile robot 200 when the autonomous mobile robot 200 enters into and exits from the docking area B.

The sensed body 130 is a recognition device disposed to determine whether the autonomous mobile robot 200 has arrived at the docking area B using an object detector (not shown). The object detector may be disposed under the autonomous mobile robot 200. When the autonomous mobile robot 200 detects the sensed body 130, it determines that it has arrived at the docking area B, then decelerates and stops.

The separation leading unit 160 may be disposed to be fixed to at least a part of the rail plate 190 along the guide rail 180. The separation leading unit 160 is disposed on the movement path of the autonomous mobile robot 200 and the docking guide 110. When the autonomous mobile robot 200 exits from the docking area B to a first position A, the separation leading unit 160 is configured to allow the autonomous mobile robot 200 and the docking guide 110 to be separated at the first position A. The separation leading unit 160 may be disposed at a point where the autonomous mobile robot 200 enters the docking device 100 for docking, that is, at the first position A.

The separation leading unit 160 may include a fixed part 162 and a protruding part 164. The fixed part 162 is fixed to at least a part of the rail plate 190 along the guide rail 180. The protruding part 164 may be formed to protrude from the fixed part 162 to allow a connecting part 112, in particular, a guide pin 1126 to be engaged therewith. The protruding part 164 is configured to allow the guide pin 1126 to be engaged therewith as the autonomous mobile robot 200 coupled to the docking guide 110 exits from the docking area B to the first position A. It is shown in FIGS. 2 to 4 that the fixed part 162 and the protruding part 164 form a right angle, but are not necessarily limited thereto, and it should be noted that the protruding part 164 may protrude at another angle where the guide pin 1126 can be engaged therewith. The protruding part 164 may have a length of 10 mm or more.

The first stopper 171 plays an auxiliary role in stopping the autonomous mobile robot 200 in the docking area B. Under normal circumstances, the autonomous mobile robot 200 can stop in the docking area B by recognizing the sensed body 130 without the first stopper 171. However, in a case where the autonomous mobile robot 200 does not properly recognize the sensed body 130, the first stopper 171 plays an auxiliary role in stopping the autonomous mobile robot 200.

The docking device 100 may further include a charging unit 140 and a charging terminal 150. The charging terminal 150 may be formed to extend from one surface of the charging unit 140 toward the first stopper 171. While the autonomous mobile robot 200 stops in the docking area B and loads objects, a part of the autonomous mobile robot 200 may come into contact with the charging terminal 150 such that the autonomous mobile robot 200 can be charged.

Referring back to FIGS. 2 to 4, the docking guide 110 may include a supporting part 111, a connecting part 112, a reflection plate 113, a coupling member 114, and an elastic member 115. The docking guide 110 is configured to detect an entry position of the autonomous mobile robot 200 (see FIG. 5 below) in order to guide the autonomous mobile robot 200 to the docking area B.

When the autonomous mobile robot 200 contacts the docking guide 110, the supporting part 111 protrudes in a direction perpendicular to the reflection plate 113 to allow one side thereof to contact a portion of the autonomous mobile robot 200.

The supporting part 111 may include a buffer 1114. The buffer 1114 is disposed to mitigate an impact applied to the autonomous mobile robot 200 when the supporting part 111 contacts the autonomous mobile robot 200. The buffer 1114 may be a roller. The buffer 1114 is disposed over one side of the supporting part 111 to prevent damage to the autonomous mobile robot 200 contacting one side of the supporting part 111.

The connecting part 112 is configured to be coupled to and separated from at least a part of the autonomous mobile robot 200, particularly a bracket 210 (see FIG. 5 below). The connecting part 112 may be rotatably coupled to the reflection plate 113. The connecting part 112 may be coupled to the reflection plate 113 by means of the coupling member 114. The connecting part 112 and the reflection plate 113 may be coupled by means of a pin or hinge to allow the connecting part 112 to rotate and/or move up and down. The connecting part 112 and the reflection plate 113 may be coupled such that at least a part of the connecting part 112 covers an upper portion of the reflection plate 113. The connecting part 112 may be made of a material such as zinc plating to minimize wear due to friction caused by repeated operations.

The connecting part 112 may include an engaging part 1122, a body part 1124 and a guide pin 1126.

The engaging part 1122 is configured to be coupled to and separated from at least a part of the autonomous mobile robot 200 (see FIG. 5 below), in particular, the bracket 210 (see FIG. 5 below). The engaging part 1122 may be configured to be engaged with the bracket 210. One side of the engaging part 1122 may have a hook shape. The engaging part 1122 may be formed to protrude from the reflection plate 113 along the exit direction of the autonomous mobile robot 200. The engaging part 1122 is connected to the body part 1124. The engaging part 1122 may be coupled to the reflection plate 113 so as to rotate about a central axis together with the body part 1124. Here, as shown in FIG. 4, the central axis may refer to a central axis of a pin or hinge when the engaging part 1122 and the body part 1124 are coupled by means of the pin or hinge.

The body part 1124 is connected to one side of the engaging part 1122 and is rotatably coupled to the reflection plate 113. The body part 1124 may be coupled to the reflection plate 113 to cover a portion of the upper portion of the reflection plate 113. The body part 1124 is configured to support the engaging part 1122, the guide pin 1126, etc.

When the autonomous mobile robot 200 coupled to the docking guide 110 exits from the docking area B and arrives at the first position A, the guide pin 1126 is configured to separate the docking guide 110 and the autonomous mobile robot 200. The guide pin 1126 is coupled to a part of the body part 1124. The guide pin 1126 may be rotatably coupled to the body part 1124.

The guide pin 1126 may separate the docking guide 110 and the autonomous mobile robot 200 by operating in conjunction with the separation leading unit 160. Specifically, when the autonomous mobile robot 200 coupled to the docking guide 110 exits from the docking area B and arrives at the first position A, the guide pin 1126 is engaged with the protruding part 164 of the separation leading unit 160. As the guide pin 1126 is engaged with the protruding part 164, the engaging part 1122 rotatably coupled to the reflection plate 113 rotates downward, and as a result, the docking guide 110 and the autonomous mobile robot 200 which are engaged with each other can be separated (see FIG. 9). As such, the docking device 100 according to the present disclosure can return the reflection plate 113 to its original position with only a simple structure of the connecting part 112 and the bracket 210 without any power supply, thereby simplifying the configuration of the device and improving the convenience of maintenance.

As shown in FIG. 4, the guide pin 1126 may be coupled to the body part 1124 so as to rotate in one direction. Specifically, the guide pin 1126 may be coupled to one side of the body part 1124 extending from the top to the bottom of the reflection plate 113 by means of a pin or hinge. As shown in FIG. 4, the guide pin 1126 may be configured to rotate in the exit direction of the autonomous mobile robot 200, but not to rotate in the entry direction. As the guide pin 1126 is configured to be rotatable in the exit direction of the autonomous mobile robot 200, even in the case where there is a foreign object such as a bolt or nut on the movement path of the guide pin 1126 when the autonomous mobile robot 200 enters, the guide pin 1126 rotates in the exit direction of the autonomous mobile robot 200 such that the autonomous mobile robot 200 and the docking guide 110 can enter the docking area B without any obstacles. Moreover, as the guide pin 1126 is configured not to rotate in the entry direction of the autonomous mobile robot 200, even in the case where there is a foreign object such as a bolt or nut on the movement path of the guide pin 1126 when the autonomous mobile robot 200 exits, the guide pin 1126 is engaged with the protruding part 164 of the separation leading unit 160 such that the autonomous mobile robot 200 and the docking guide 110 can be smoothly separated at the first position A. As such, in the docking device 100 according to the present disclosure, as the guide pin 1126 is configured to be rotatable in one direction, it is possible to allow the autonomous mobile robot 200 to operate smoothly without any obstacles in the case where there is a foreign object on the path during the entry and exit of the autonomous mobile robot 200, and it is also possible to prevent the components of the docking device 100 from being damaged.

The guide pin 1126 may have a length greater than that of the protruding part 164 of the separation leading unit 160. For example, if the above-mentioned protruding part 164 of the separation leading unit 160 has a length of 10 mm or more, the guide pin 1126 may have a length of 35 mm or more. Accordingly, even in the case where there is a foreign object such as a bolt or nut (typically within 20 mm) on the movement path of the autonomous mobile robot 200, the autonomous mobile robot 200 and the docking device 100 can operate smoothly.

The connecting part 112 may be coupled to the reflection plate 113 by means of the coupling member 114. The engaging part 1122, the body part 1124, and the coupling member 114 may be coupled by means of a pin or hinge. The coupling member 114 may be coupled to the reflection plate 113 in a screw fastening manner, for example. Here, the length of the coupling member 114 may be determined based on the length of the reflection plate 113 and/or the horizontal length of the connecting part 112, but may be determined to have a minimum length to allow the connecting part 112 to be firmly fixed to the reflection plate 113 and the autonomous mobile robot 200 to easily recognize the reflection plate 113.

The elastic member 115 may connect the connecting part 112 and the reflection plate 113. As shown in FIG. 4, one side of the elastic member 115 may be connected to a lower part of the reflection plate 113 in the entry direction of the autonomous mobile robot 200, and the other side may be connected to the opposite side to which the engaging part 1122 of the body part 1124 is connected. As the elastic member 115 is connected in the above-described manner, the connecting part 112 rotated to separate the autonomous mobile robot 200 and the docking guide 110 can return to its original position by the elastic force of the elastic member 115. The elastic member 115 may be a spring, for example, and may be plural in number.

The reflection plate 113 is configured to receive a signal from the object detector and reflect the signal in order for the autonomous mobile robot 200 to detect a docking entry position using the object detector. Here, the object detector may be a radar, lidar, ultrasonic sensor, etc. Furthermore, in order to improve the recognition accuracy of the autonomous mobile robot 200, a QR code may be attached to at least a part of the reflection plate 113.

FIGS. 5 to 9 illustrate a docking process of an autonomous mobile robot in a docking system according to an embodiment of the present disclosure.

Prior to illustrating the docking process, as shown in FIGS. 5 to 9, the autonomous mobile robot 200 may include a bracket 210 configured to be coupled to and separated from the connecting part 112. The bracket 210 is disposed on at least a part of the autonomous mobile robot 200. The bracket 210 may be disposed at a position facing the docking guide 110 when the autonomous mobile robot 200 enters the docking area B. Moreover, if a part of the engaging part 1122 has a ring shape, at least a part of the bracket 210 may have a ring shape corresponding to the shape of the engaging part 1122 to allow the bracket 210 and the engaging part 1122 to be coupled to each other. For example, as shown in FIGS. 5 to 9, the ring shape of the engaging part 1122 may be formed to face upwards, and the ring shape of the bracket 210 may be formed to face downwards. However, the shapes of the engaging part 1122 and the bracket 210 are not limited thereto, and may have other shapes that can be fastened to each other or have a ring shape formed in a different direction.

Figure 5:
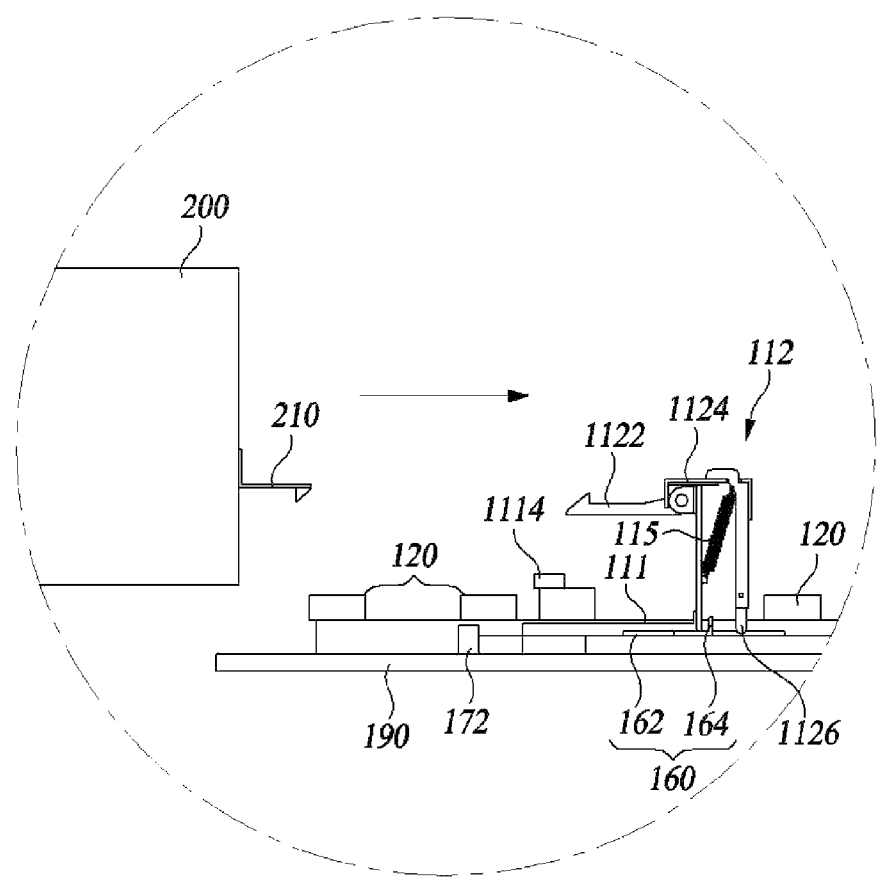
FIGS. 5 to 9 illustrate a docking process of an autonomous mobile robot in a docking system according to an embodiment of the present disclosure.

FIG. 5 shows that the autonomous mobile robot 200 recognizes the docking guide 110 including the connecting part 112 and moves toward the docking guide 110 in the docking system 1000 according to the present disclosure.

When the autonomous mobile robot 200 enters the docking device 100, it passes through the guide roller 120 for guiding the movement of the autonomous mobile robot 200 within the docking device 100.

Figure 6:
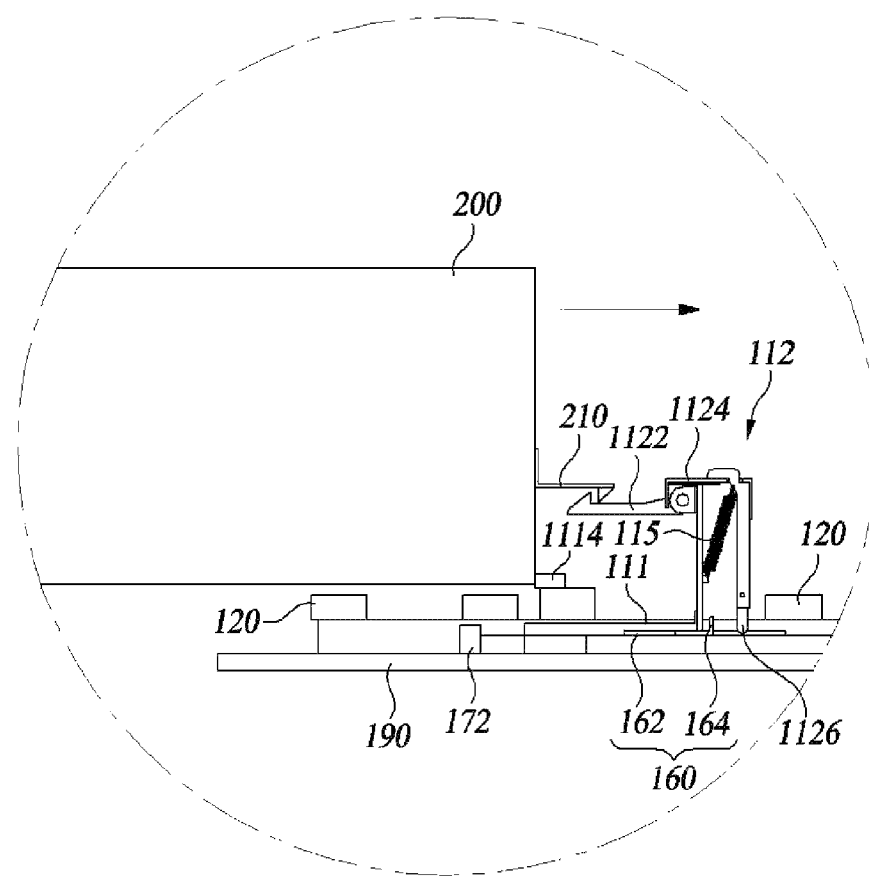

FIG. 6 shows that the autonomous mobile robot 200 enters the docking area B in a state where the autonomous mobile robot 200 comes into contact with the buffer 1114 of the docking guide 110 in the docking system 1000.

When the autonomous mobile robot 200 enters the docking area B under the guidance of the guide roller 120, it moves while pushing the docking guide 110. The autonomous mobile robot 200 may move in a state where it comes into contact with the buffer 1114 of the supporting part 111 of the docking guide 110. The autonomous mobile robot 200 may move the docking guide 110 by pushing the buffer 1114 which is brought into contact therewith.

Figure 7:
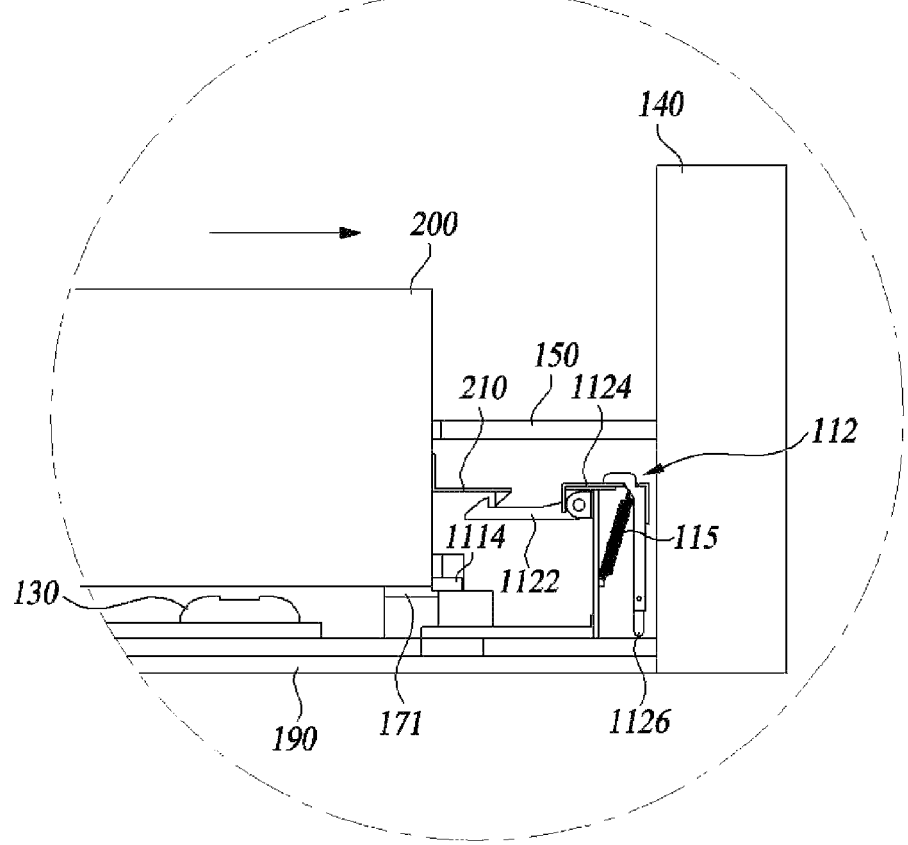

FIG. 7 shows that the autonomous mobile robot 200 has arrived at the docking area B in the docking system 1000.

When the autonomous mobile robot 200 detects the sensed body 130, it determines that it has arrived at the docking area B, then decelerates and stops.

Figure 8:
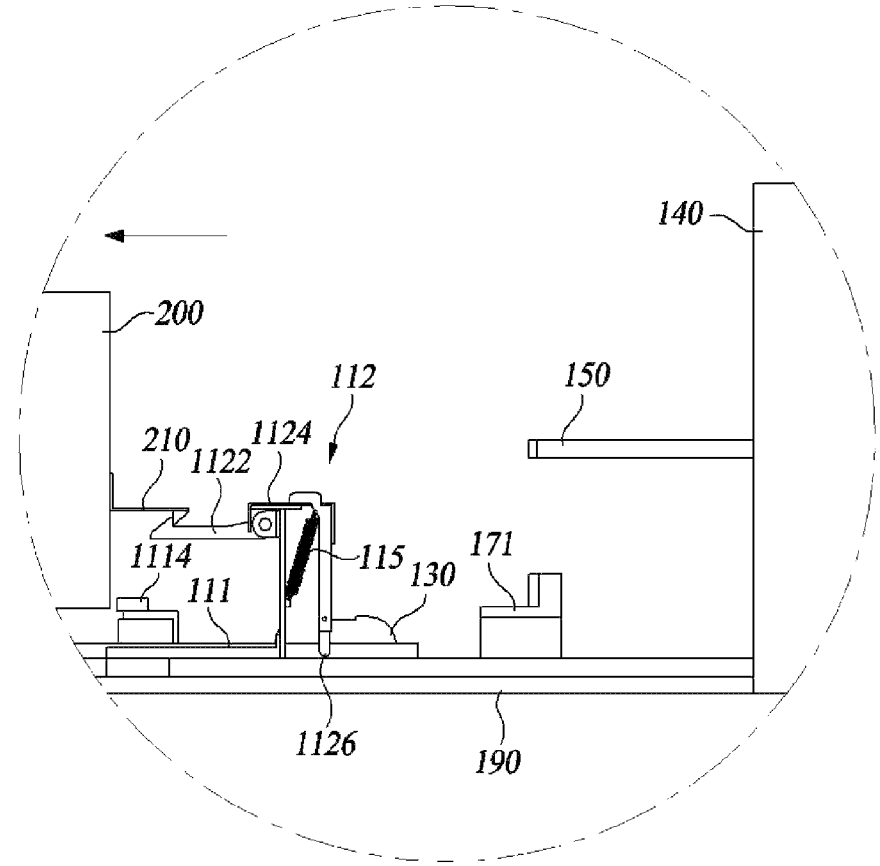

FIG. 8 shows that the autonomous mobile robot 200 exits from the docking area B in the docking system 1000.

The autonomous mobile robot 200 exits in a direction opposite to the direction in which it has entered along the guide roller 120. At this time, no power is supplied to the docking guide 110. The docking guide 110 is coupled to the autonomous mobile robot 200 by means of the bracket 210 and the engaging part 1122 and moves along with the autonomous mobile robot 200.

As such, it is possible to return the docking guide 110 to the first position A using the engaging part 1122 and the bracket 210 of relatively simple structures without any power supply. Moreover, since the bracket 210 and the engaging part 1122 are coupled to each other only when the autonomous mobile robot 200 exits from the docking area B, it is possible to minimize damage to the coupling configuration of the autonomous mobile robot 200 and the docking guide 110 and eliminate the need for separate design and standard selection according to the weight of the autonomous mobile robot 200 and/or the goods loaded on the autonomous mobile robot 200, thereby facilitating the production and maintenance.

Figure 9:
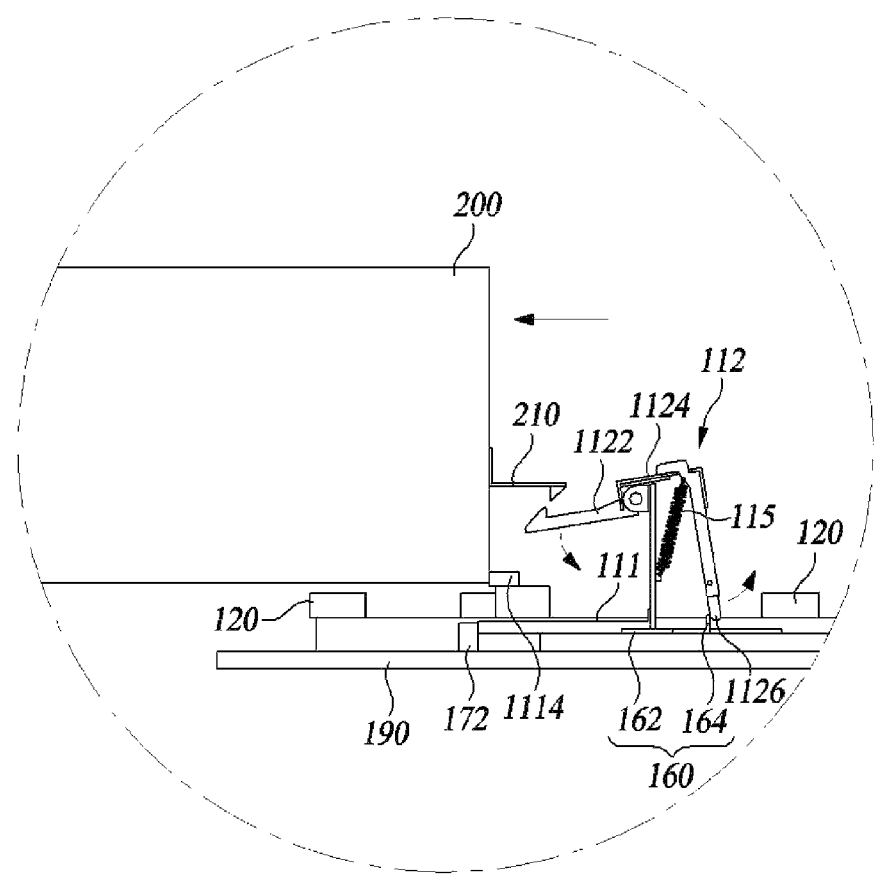

FIG. 9 shows that the autonomous mobile robot 200 is separated from the docking device 100 in the docking system 1000.

The docking guide 110 is coupled to the autonomous mobile robot 200 and exits from the docking area B. When the docking guide 110 arrives at the first position A, it is separated from the autonomous mobile robot 200. Specifically, when the autonomous mobile robot 200 coupled to the docking guide 110 exits from the docking area B and arrives at the first position A, the guide pin 1126 is engaged with the protruding part 164 of the separation leading unit 160. As the guide pin 1126 is engaged with the protruding part 164, the engaging part 1122 rotatably coupled to the reflection plate 113 rotates downward, and as a result, the docking guide 110 and the autonomous mobile robot 200 which are engaged with each other are separated.

After the docking guide 110 and the autonomous mobile robot 200 are separated, the rotated connecting part 112 may return to its original position by the elastic force of the elastic member 115.

Figure 10:
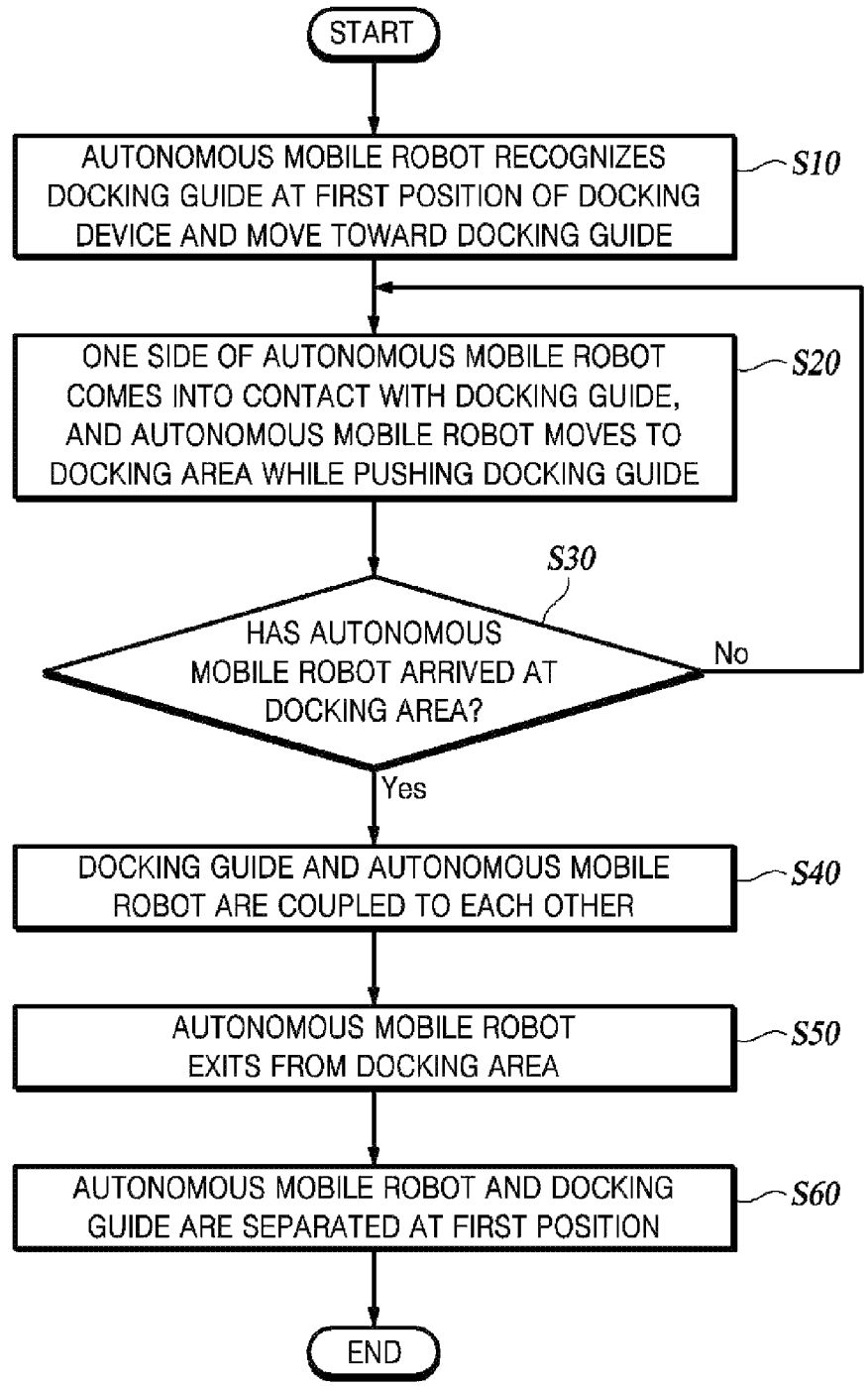
FIG. 10 is a flowchart of a docking method according to an embodiment of the present disclosure.

FIG. 10 is a flowchart of a docking method according to an embodiment of the present disclosure. Hereinafter, a redundant description of the docking device 100 and the docking system 1000 will be omitted.

The autonomous mobile robot 200 recognizes the docking guide 110 in the first position A of the docking device 100 and moves toward the docking guide 110 (S10).

One side of the autonomous mobile robot 200 comes into contact with the docking guide 110, and the autonomous mobile robot 200 moves to the docking area B while pushing the docking guide 110 (S20). The autonomous mobile robot 200 moves to the docking area B along the guide rollers 120 disposed on the docking device 100.

It is determined whether the autonomous mobile robot 200 has arrived at the docking area B (S30). The autonomous mobile robot 200 may determine whether it has arrived at the docking area B by detecting the sensed body 130 using the object detector.

When it is determined that the autonomous mobile robot 200 has not arrived at the docking area B, the above-mentioned step S20 is performed.

When it is determined that the autonomous mobile robot 200 has arrived at the docking area B, the docking guide 110 and the autonomous mobile robot 200 are coupled to each other (S40). The docking guide 110 is coupled to the autonomous mobile robot 200 by means of the connecting part 112 rotatably coupled to the reflection plate 113. Specifically, the engaging part 1122 of the connecting part 112 and the bracket 210 of the autonomous mobile robot 200 are coupled to each other, and as a result, the docking guide 110 and the autonomous mobile robot 200 are coupled to each other.

The autonomous mobile robot 200 exits from the docking area B (S50). When the autonomous mobile robot 200 exits, the docking guide 110 coupled to the autonomous mobile robot 200 also moves together.

At the first position A, the autonomous mobile robot 200 and the docking guide 110 are separated (S60). Since the docking guide 110 is stopped by the second stopper 172 at the first position A and the autonomous mobile robot 200 continues to move, the docking guide 110 and the autonomous mobile robot 200 are separated.

The autonomous mobile robot 200 and the docking guide 110 are separated, and the docking is terminated as the autonomous mobile robot 200 moves away from the docking device 100.

According to an embodiment, the docking device, the docking system, and the docking method can eliminate the components used in conventional docking devices such as a controller, a motor, a belt, a plurality of sensors, etc. and replace them with a docking guide having a relatively simple configuration, thereby reducing the manufacturing cost.

According to an embodiment, it is possible to facilitate the maintenance of the docking device by minimizing the components included in the docking device.

According to an embodiment, it is possible to allow the docking guide to dock with the autonomous mobile robot even without receiving its power supply.

Although the respective processes in the flowchart are described to be sequentially performed, it is merely intended to illustrate the technical idea of some embodiments of the present disclosure. In other words, those skilled in the art to which some embodiments of the present disclosure pertain may change and execute the processes described in the flowchart or execute one or more processes in parallel in various manners without departing from the essential characteristics of some embodiments of the present disclosure, and thus the flowchart is not limited to a time-series order.

The computing apparatuses, the electronic devices, the processors, the memories, and other components described herein are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A docking device to move a mobile robot to a docking area, the docking device comprising:
    a docking guide configured to detect an entry position of the mobile robot and to guide the mobile robot to the docking area and comprising a connecting part configured to be coupled to and separated from a part of the mobile robot; and
    a guide rail disposed to provide a path for the docking guide to move to the docking area, in response to the part of the mobile robot being coupled to the docking guide,
    wherein in response to the mobile robot arriving at the docking area, the docking guide is couple to the part of the mobile robot,
    wherein the docking guide is configured to be coupled to the mobile robot and move together, in response to the mobile robot exiting from the docking area, and
    wherein in response to the mobile robot arriving at the entry position, the docking guide is separated from the part of the mobile robot.

2. The docking device of claim 1, wherein the connecting part comprises:
    an engaging part configured to be coupled to the part of the mobile robot;
    a guide pin configured to separate the mobile robot and the engaging part; and
    a body part supporting the engaging part and the guide pin.

3. The docking device of claim 2, wherein the docking guide further comprises a reflection plate configured to reflect a signal from an object detector for the mobile robot to detect a docking entry position using the object detector.

4. The docking device of claim 3, wherein the engaging part is formed to protrude along a direction of the mobile robot exiting from the docking area.

5. The docking device of claim 3, wherein the connecting part is rotatably coupled to the reflection plate.

6. The docking device of claim 3, wherein the docking guide further comprises an elastic member connecting the body part and the reflection plate.

7. The docking device of claim 2, wherein the guide pin is coupled to the body part to be rotatable along a direction of the mobile robot exiting from the docking area.

8. The docking device of claim 2, further comprising a separation leading unit disposed on a movement path of the mobile robot, wherein the separation leading unit is configured to separate the mobile robot and the engaging part by engaging the guide pin during the movement of the mobile robot.

9. The docking device of claim 8, wherein the separation leading unit comprises:
    a fixed part fixed to a rail plate supporting the guide rail; and
    a protruding part protruding from the fixed part and being configured to engage the guide pin.

10. The docking device of claim 2, wherein:
    the guide pin is configured to rotate in one direction with respect to the body part within an angle, and to not rotate in a direction opposite to the one direction with respect to the body part;
    the guide pin is rotated in the one direction within the angle to avoid a protruding structure disposed on the guide rail and to maintain the engaged state of the engaging part and the mobile robot, in response to the mobile robot moving toward the docking area, and
    the guide pin is engaged with the protruding structure and rotated along with the body part and the engaging part in the opposite direction to release the engaging part from the mobile robot, in response to the mobile robot moving away from the docking area.

11. The docking device of claim 1, wherein the docking guide further comprises a supporting part configured to allow one side thereof to contact the mobile robot, in response to the mobile robot entering the docking area.

12. The docking device of claim 11, wherein the docking guide further comprises a buffer disposed on one side of the supporting part to prevent damage to the mobile robot which is brought into contact with the supporting part.

13. The docking device of claim 1, further comprising a sensed body disposed in the docking area and being configured to determine whether the mobile robot has arrived at the docking area.

14. The docking device of claim 1, wherein the mobile robot and the docking guide are separated as at least a part of the connecting part rotates.

15. The docking device of claim 1, wherein the mobile robot is an autonomous mobile robot.

16. A docking system comprising:
    a mobile robot; and
    a docking device configured to guide the mobile robot to a docking area,
    wherein the docking device comprises:
    a docking guide configured to detect an entry position of the mobile robot and to guide the mobile robot to the docking area and comprising a connecting part configured to be coupled to and separated from a part of the mobile robot; and
    a guide rail disposed to provide a path for the docking guide to move to the docking area, in response to the part of the mobile robot being coupled to the docking guide,
    wherein in response to the mobile robot arriving at the docking area, the docking guide is coupled to the part of the mobile robot, wherein the docking guide is configured to be coupled to the mobile robot and move together, in response to the mobile robot exiting from the docking area, wherein in response to the mobile robot arriving at the entry position, the docking guide is separated from the part of the mobile robot.

17. The docking system of claim 16, wherein the mobile robot enters the docking area while pushing the docking guide.

18. The docking system of claim 16, wherein the mobile robot comprises a bracket configured to be coupled to and separated from the connecting part.

19. The docking system of claim 16, wherein at least a part of the connecting part has a ring shape.

* * * * *